United States Patent [19]

Stelwagen

[11] 4,055,220
[45] * Oct. 25, 1977

[54] TRANSFER OF HEAT BETWEEN TWO BODIES

[75] Inventor: Willem Stelwagen, Velp, Netherlands

[73] Assignee: Akzona Incorporated, Asheville, N.C.

[*] Notice: The portion of the term of this patent subsequent to Oct. 25, 1993, has been disclaimed.

[21] Appl. No.: 60,371

[22] Filed: Aug. 3, 1970

[30] Foreign Application Priority Data

Aug. 7, 1969 Netherlands .......................... 6912025

[51] Int. Cl.² .......................... F28D 11/02; F28F 5/02
[52] U.S. Cl. .................................... 165/89; 165/86; 219/469; 57/34 HS; 28/217
[58] Field of Search .................. 165/86, 89, 90, 1, 109; 219/388, 469–471; 28/62, 71.3; 57/34 HS; 29/110, 115; 308/9, 77, DIG. 1, 76, 122

[56] References Cited

U.S. PATENT DOCUMENTS

| 2,773,725 | 12/1956 | Roberts .................................. 308/77 |
| 2,885,915 | 5/1959 | Schurger ........................ 308/DIG. 1 |
| 2,929,671 | 3/1960 | Taylor ................................ 308/9 X |
| 3,061,940 | 11/1962 | Cichelli ............................... 165/1 X |
| 3,119,639 | 1/1964 | Adams .................................... 308/9 |
| 3,176,507 | 4/1965 | Digesu et al. .................. 308/DIG. 1 |
| 3,307,621 | 3/1967 | Whisnant et al. ...................... 165/89 |
| 3,479,689 | 11/1969 | Kurzke et al. ...................... 165/89 X |
| 3,584,471 | 6/1971 | Powell .............................. 165/120 X |

OTHER PUBLICATIONS

Arwas, E. B. et al. *Lubrication*, Machine Design, Oct. 14, 1965, pp. 214 to 220.

*Primary Examiner*—Albert W. Davis, Jr.
*Attorney, Agent, or Firm*—Francis W. Young; Tom R. Vestal

[57] ABSTRACT

This invention is directed to a method and apparatus for transferring heat between two bodies separated by a narrow space and movable relative to each other, the temperature of one body dependent upon the temperature of the other body.

7 Claims, 11 Drawing Figures

INVENTOR.
WILLEM STELWAGEN
BY Francis W. Young
ATTORNEY

INVENTOR.
WILLEM STELWAGEN
BY Francis W. Young
ATTORNEY

TRANSFER OF HEAT BETWEEN TWO BODIES

The invention relates to a method for the transfer of heat between a first and a second body, the temperature of the second body depending on that of the first body, which bodies are separated by a narrow interspace and are movable relative to each other.

The method may be used for heating or cooling the second body. In the former case, the first body constitutes a heating element which heats the second body. In the latter case, the first body is a cooling element which cools the second body.

With a known method of this type for the heating of synthetic threads, heat is transferred to a thread-wrapped roller by means of a stationary heating element positioned inside the roller.

A disadvantage of this known method is that on its way from the heating element to the heated element, in this case the roller, the heat has to pass a considerable barrier in the form of an air gap positioned between the roller and the heating element. The thermal resistance of this gap is relatively high, partly because the heat conductivity of air is low and partly because the air gap must be sufficiently wide to ensure that the roller and the heating element will not contact each other under high thermal and mechanical loads.

Consequently, there is the trend to develop heated rollers of the type where the generation of heat takes place in the roller itself. But with such a construction there is the problem of the supply and control of energy for a rotating heating element.

The method according to the invention is characterized in that to the interspace there is supplied a non-solid interspacial substance, and in that in the interspace there is a pressure built up which increases with decreasing width of the interspace between the bodies.

Consequently, with the novel method the interspacial substance not only serves to transfer heat but also to ensure that between the first and the second bodies a minimum clearance is maintained.

In essence, the improvement consists in that the influence of the mechanical load on the distance to be maintained between the two bodies is no longer, or at least a far less, critical factor. For the compressed medium also serves, as it were, as a bearing lubricant which prevent direct contact between the two bodies. In principle, both the first and the second bodies may be movable. In general, however, only one of these two bodies will be movable and the other stationary. The interspacial substance supplied may be a liquid material such as a liquid or a liquid metal. Use may, for instance, be made of water, which has a fairly high coefficient of heat conductivity.

However, preference is given to a method in which the interspacial substance used is a gaseous substance and in which the interdistance between the two bodies is kept smaller than $500\mu$ m, and preferably smaller than $100\mu$ m. The advantage offered by a gas are that it does not cause formation of dirt, nor gives rise to considerable friction, and that its viscosity, contrary to that of a liquid, increases with increasing temperature. Conceivable gaseous media are, for instance, helium and hydrogen. Helium, however, is a relatively expensive gas; and the application of hydrogen calls for special provisions in view of explosion risks. Air or steam are therefore to be preferred. Steam is particularly suitable in cases where it is already available as heating medium.

The invention also relates to an apparatus for the transfer of heat between a first and a second body, the temperature of the second body depending on that of the first body, which bodies are movable relative to each other, the heat being transferred across a transfer-gap bounded by at least two closely spaced transfer-surfaces of the first body and the second body, respectively. The terms "transfer-gap" and "transfer-surfaces" indicate that between the two bodies the transfer of heat substantially takes place across the gap between those surfaces of the first and the second body that are nearest to each other.

The apparatus is characterized in that there have been provided means for making the bodies movable relative to each other so that the distance between the transfer-surfaces is variable, and means for supplying to the transfer gap a compressed non-solid interspacial substance, and means for causing the pressure of the interspacial substance in the transfer-gap to increase with decreasing width of the gap.

It is preferred to use an apparatus which is characterized in that in at least one of the bodies there is provided at least one flow restriction which ends in the transfer-gap and via which the interspacial substance is supplied to the transfer-gap from a constant pressure source.

The function of the flow restriction is to make the pressure in the transfer-gap dependent on the width of the gap. In this way, the pressure in the transfer-gap will vary with the width of the gap. As the width of the gap increases, the pressure in the gap will decrease, and conversely. In this way a proper heat transfer may be obtained in that at a minimum width of the gap there is created a stable equilibrium between two opposite forces acting on the apparatus.

The one force, which is created by the pressure in the transfer-gap, urges the two bodies apart. But the other force, which may be created by a particular mechanical load, drives the two bodies toward each other.

With a variant embodiment of the apparatus according to this invention, the second body is formed by a roller mounted on a driving shaft. This embodiment is characterized in that the transfer-surfaces bound a transfer-gap that is symmetric about the axis of rotation of the roller.

A variant embodiment of the apparatus is characterized in that in axial direction the transfer-surfaces are equidistant, and in that the roller and the first body are axially movable relative to each other, and in that it comprises means which in axial direction try to force the roller and the first body toward each other. By "axially equidistant" is meant that the distance between the transfer-surfaces measured parallel to the axis of rotation of the roller is the same everywhere. Although upon axial displacement of the roller and the first body relative to each other, the distance between the transfer-surfaces is changed, they remain equidistant.

The main advantage offered by this construction is that it permits the influence of the thermal expansion of the roller and the first body on the width of the transfer-gap to be eliminated by their relative axial movability.

A preferred variant embodiment of the latter construction is characterized in that the transfer-surfaces extend perpendicular to the axis of rotation of the roller.

With a different preferred variant embodiment the transfer-surfaces bound a conical transfer-gap. By "conical" is to be understood here that the transfer-gap may be in the form of a conical solid of revolution with a straight or curved generatrix. Owing to the conical shape of the transfer-gap the latter variant embodiment may simultaneously serve as radial bearing.

According to another embodiment, the transfer-surfaces bound a cylindrical transfer-gap.

The relative axial movability of the roller and the first body can be obtained by making the first body axially movable.

It is preferred, however, that use should be made of an embodiment characterized in that there has been provided a roller which is slidable on the driving shaft.

The apparatus preferably should be so constructed that it is possible for the roller to make a tilting movement relative to the first body. By "tilting movement" is to be understood a movement about any axis in a plane perpendicular to the axis of rotation of the roller.

One advantage of the tilting movement is that upon deflection of the driving shaft the roller can under the influence of the compressed interspacial substance adjust itself in such a way that its transfer-surface remains parallel to that of the first body. This does away with the necessity of making the driving shaft so rigid that under a radial load its deflection is only negligibly small. Another advantage offered by the tilting movement is that in order to ensure that the transfer-surfaces are parallel to each other no close tolerance limits need be adhered to.

A suitable embodiment for obtaining the tilting movement is characterized in that the roller is mounted on the end of a driving shaft at least part of which has a relatively low flexural rigidity. By "relatively low flexural rigidity" is understood here that the driving shaft, or at least part thereof, is sufficiently flexible to allow for the tilting movement.

Another effective embodiment providing the required tilting movement is characterized in that the roller is mounted on the driving shaft with some clearance being left, and in that for communicating the rotation of the driving shaft to the roller the latter is coupled with the driving shaft by means of a diaphragm.

A very effective variant embodiment to be applied for obtaining the required tilting movement is characterized in that inside the roller there is provided a bearing bushing which is mounted on the driving shaft with some clearance being left, and in that for communicating the rotation of the driving shaft to the roller these members are interconnected by means of a flexible coupling. By "flexible coupling" is meant a coupling that permits some relative movement of the intercoupled parts.

With another favorable embodiment, the tilting movement is obtained in that the roller is mounted on the end of a short shaft which is at its opposite end supported in a self-adjusting bearing, and in that for communicating the rotation of the driving shaft to the short shaft these two members are interconnected by means of a flexible coupling.

Still another variant embodiment with a tiltable roller is characterized in that the roller is mounted on the end of a short shaft which is at its opposite end coupled with the driving shaft by means of a coupling comprising a coupling half which is attached to the driving shaft and has internal teeth, and a coupling half which is mounted on the short shaft and has external convex teeth which mesh with the internal teeth of the former coupling half.

A further preferred embodiment is characterized in that at least one of the transfer-surfaces is provided with one or more grooves by means of which, upon relative rotation of the two bodies, the grooved transfer-surface and the other transfer-surface cooperate in obtaining a pumping action so that the interspacial substance is sucked into the transfer-gap and/or prevented from escaping therefrom.

It is recommended that the second body contain a material having good thermal conductivity, such as copper or aluminum.

With another preferred embodiment, the first body is provided with a channel system for guiding a liquid and/or gaseous heat-transfer medium. If this channel system serves to guide a heat-transfer medium simultaneously present in liquid and gaseous states, then it is preferred to use a construction with a channel system comprising one flow restriction or a plurality of interspaced flow restrictions.

The invention also relates to an apparatus for the heating of thread or ribbon-shaped material, which apparatus is characterized in that the second body is in the form of a rotatable cylindrical part which comes into contact with the thread or ribbon-shaped material, and in that the first body is in the form of a stationary heating block, and in that in the heating block there are provided flow restrictions via which the compressed interspacial substance is supplied, the restrictions being arranged symmetrically about the axis of rotation and ending in the transfer-gap.

This invention will be elucidated further with reference to the examples of embodiments shown in the accompanying drawings wherein.

Figure 1:
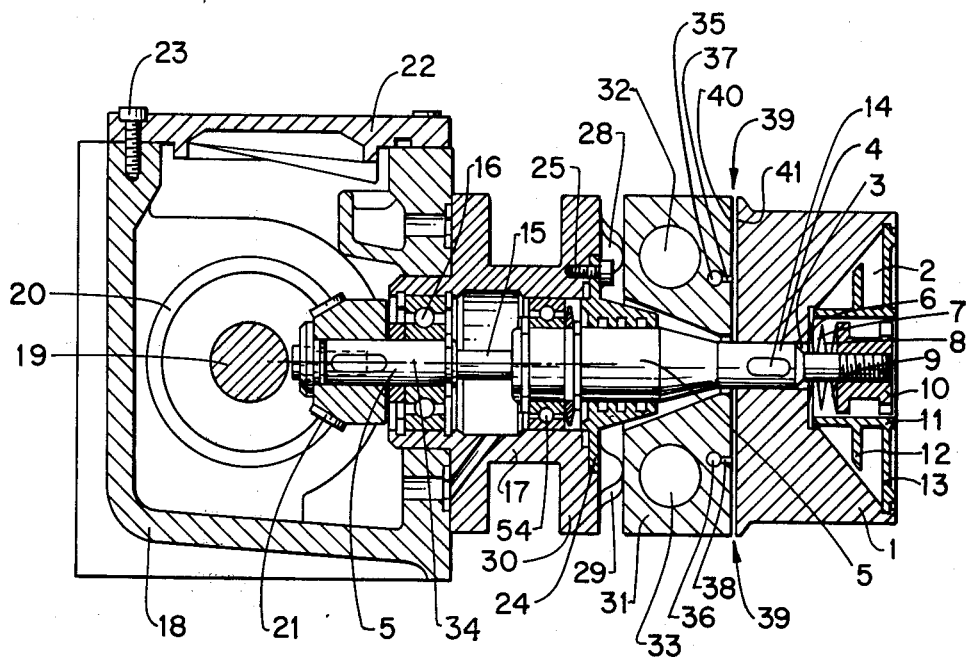
FIG. 1 shows an embodiment according to the invention of a transport roller for the forwarding and heating of thermoplastic threads.

In FIG. 1 the numeral 1 refers to a heatable transport roller for thermoplastic threads. By giving them a few wraps around the roller and the associated idler roller, the threads are caused to travel at a predetermined speed and, moreover, heated.

The transport roller may form part of a drawing apparatus in which the as yet undrawn or partially drawn threads are irreversibly elongated in order to obtain threads that have acceptable values as far as breaking strength and elongation are concerned.

Provided in the roller 1 are a conically shaped recess 2 and a bore 3 through which passes the end 4 of a driving shaft 5. Slid on the end are four cup washers 6 to 9, which are forced against the roller 1 by means of a nut 10 screwed on the driving shaft. A sleeve 11 with disc-shaped ribs 12, 13 shuts off the conical recess 2 and serves to insulate the heat.

The rotation of the driving shaft 5 is transmitted to roller 1 by means of a key-type coupling with key 14. Roller 1, however, is axially slidable on end 4 of the driving shaft.

Driving shaft 5 has a reduced portion 15, which has a lower flexural rigidity than the remaining loaded part of the shaft. Driving shaft 5 is supported in ball bearing 16 and in grooved ball bearing 54. The ball bearings are both located in a bushing 17 which is attached to housing 18. Bushing 17 is on its right-hand side shut off by plate 24, which is secured to the bushing by means of bolts 25. Provided in plate 24 is a bore for the passage of driving shaft 5.

Located in housing 18 is driven shaft 19 with a bevel gear 20 which meshes with a second bevel gear 21 on driving shaft 5. The rotation of roller 1 is effected through shaft 19, bevel gears 20, 21, and the driving shaft 5. The housing 18 is accessible via cover 22, which is secured to the housing with the aid of bolts 23.

Bearing against projections 28, 29 on flange 30 of bushing 17 is heating block 31. Heating block 31 comprises a channel system of two channels 32, 33 for the supply to the heating block of hot water or steam, or some other liquid or gaseous heating medium. Provided in heating block 31 are four small channels which connect with one another and form the sides of a quadrangle whose center is on the axis of rotation 34 of the roller. Two of these channels are shown in FIG. 1 and referred to by numerals 35, 36. By way of a moisture separator, a dust filter and a reducing valve the small channels connect with a source of compressed air.

Communicating with each of the four small channels are two axial flow restrictions, which end on the right-hand side of heating block 31. Of the total number of eight restrictions, two are shown in FIG. 1 and referred to by numerals 37, 38. Their outlet openings are circularly arranged about the axis of rotation 34. A more detailed view of one of the restrictions is shown in FIG. 2, from which it can be seen that they directly connect with the transfer-gap 39.

Figure 2:
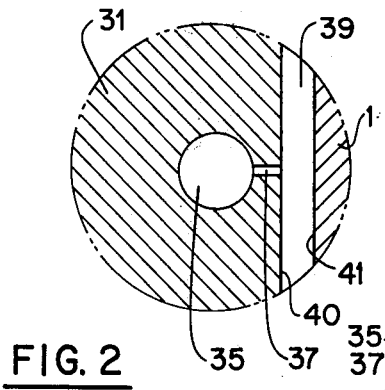
FIG. 2 shows a detail of the apparatus of FIG. 1.

Between heating block 31 and roller 1 is transfer-gap 39 which is bounded by the transfer surface 40, 41, formed by the right-hand surface of heating block 31 and the left-hand face of roller 1, respectively (see FIGS. 1 and 2).

The aforedescribed apparatus operates as follows. Prior to the driving mechanisms 19, 20 being put into operation, compressed air is supplied to the transfer-surface 40 via small channels 35, 36, and 37, 38 in heating block 31. The pressure exerted by the air on the surface 41 of roller 1 causes the latter to move to the right against the action of the cup washers 6 to 9. As soon as transfer-gap 39 thus formed has reached a width of $10\mu$ m an equilibrium is set up between the axial forces acting on roller 1, which forces are due to the oppositely acting air pressure and cup washers. Roller 1 can now be set rotating. To channels 32, 33 of heating block 31 hot water or steam is supplied, depending on the temperature to be attained. The heating medium heats roller 1 via heating block 31 and transfer-gap 39. The thermal resistance of the latter is low owing to its extremely small width, which ensures a satisfactory transfer of heat.

If the transfer-gap 39 tends to narrow under the influence of the axial expansion of heating block 31 and roller 1, the air pressure in the slit will increase relatively strongly as a result of the presence of the flow restrictions, so that the roller is prevented from contacting the heating block. And conversely, the gap is prevented from widening by the decreasing of the air pressure in the transfer-gap.

Similarly, roller 1 is prevented from taking up an oblique position under the influence of a radial load. To this end, the roller should be able to make a tilting movement which enables the roller, also when under a radial load, to keep its transfer-surface 41 parallel to the transfer-surface 40 of the heating block.

With the present apparatus, the tilting movement is made possible by the reduced flexural rigidity of part 15 of driving shaft 5. Partly as a result of grooved ball bearing 54 having some play, roller 1 can make such a tilting movement as enables transfer-surface 41 to be kept at least substantially parallel to transfer-surface 40.

When the apparatus is put out of operation, first of all the driving mechanism is switched off and not until then is the air pressure removed; this order is adhered to for the purpose of preventing the roller, when running to a stop, from contacting the heating block.

A pressure-actuated switch, not shown, will automatically switch off the driving mechanism in the event of an abrupt stop of the air pressure.

The air in transfer-gap 39 not only serves to transfer heat but also acts as an aerostatic bearing of roller 1, resulting in the latter displaying an excellent running performance, which is of importance, particularly in the case of high speeds.

To the compressed air source a plurality of rollers may be connected. In that case, the pressure of the compressed air may serve collectively to set the width of the transfer-gaps and consequently also the temperature of the rollers. To minimize the loss of compressed medium, the aerostatic action may be combined with an aerodynamic action.

With this combination, the interspacial substance can be prevented from flowing out of the transfer-gap by pumping it back. The pumping action required may be obtained by a system of grooves which, analogous to a spiral-grooved bearing, is provided in either of two surfaces that are rotatable relative to each other. With the embodiment shown in FIG. 1, they may be the transfer-surfaces 40, 41. Such a combination of aerostatic and aerodynamic action is of importance also in that in the event of an abrupt failure of the aerostatic action it may serve to maintain a certain amount of pressure in the transfer-gap as long as rotation takes place.

It will be clear that instead of air other compressed media may be used. It is, for instance, conceivable that the steam used for heating is also fed to the transfer-gap.

Instead of being heated with a liquid or a gaseous medium the block may be heated electrically, for instance, by resistance elements or by the direct passing of current therethrough, the block itself serving as resistance element. Particularly the latter method makes it very possible for the heating to be limited to an electrically conducting thin layer contiguous to the transfer-surface 40 if it is desirable that the heating capacity of the heating element should be kept low.

The temperature profile on the running surface of the roller is highly dependent on the shape and material of the roller. In order that the temperature profile may be as flat as possible, it is recommendable that use should be made of a core which has good thermal conductivity and which, to prevent it from getting damaged, is surrounded with a hard sleeve. This sleeve may be provided on the core by soldering, shrinking or rolling-on, spraying, electolytic or non-electrolytic depositing, or metalliding.

Another possibility is the inclusion, inside the roller, of a liquid-vapor system, in which the absorption and emission of heat of evaporation and of condensation, respectively, has a temperature-equalizing effect.

Figure 3:
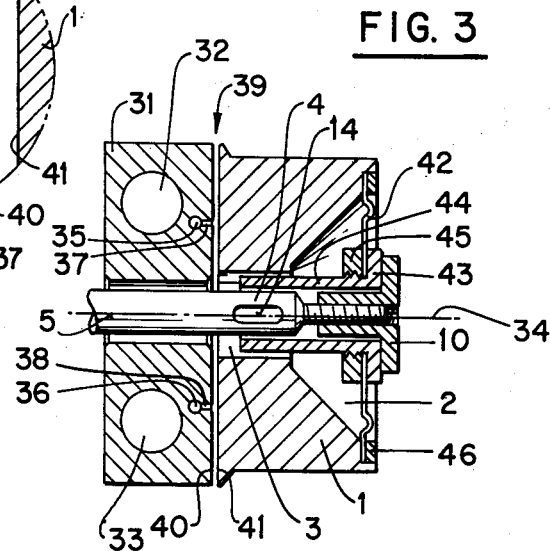
FIG. 3 shows a transport roller which is coupled with the driving shaft by means of a diaphragm.
Figure 4:
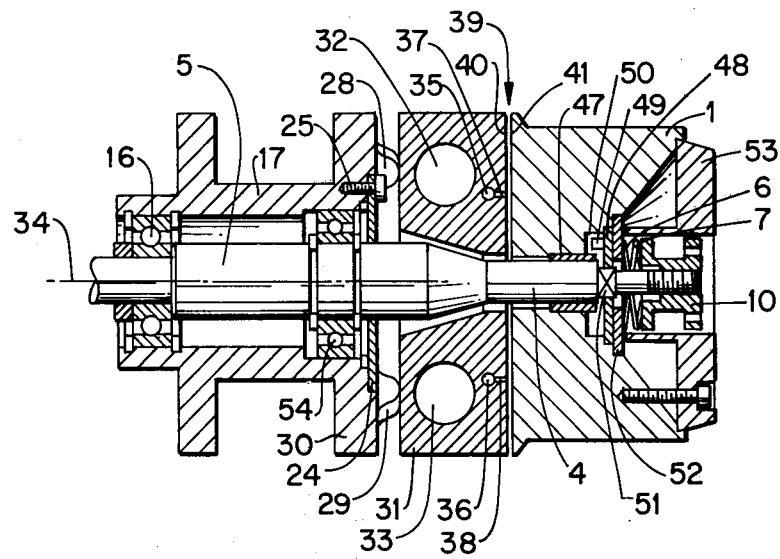
FIG. 4 shows a transport roller which is mounted on the driving shaft by means of a special bearing bushing.
Figure 5:
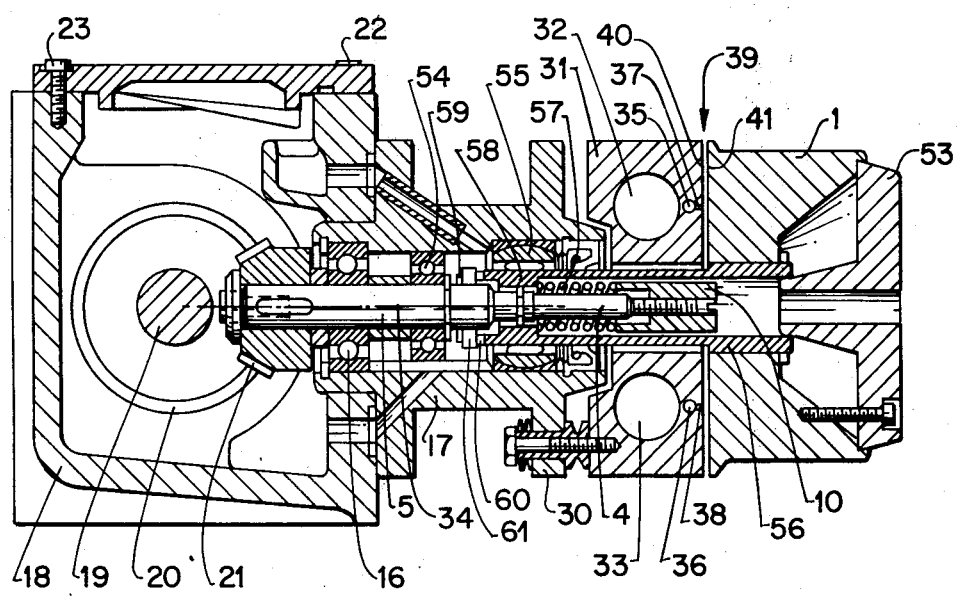
FIG. 5 shows a transport roller which is rotatably supported by a self-adjusting needle bearing.

The difference between the embodiments shown in FIGS. 3, 4 and 5 and that shown in FIG. 1 resides only in the manner in which the tilting movement of the roller has been realized. Therefore, the discussion of these variant embodiments will mainly be confined to the realization of the aforementioned tilting movement, like parts being indicated by like numerals.

In the embodiment shown in FIG. 3, roller 1 is coupled with the driving shaft 5 by means of a diaphragm 42.

To this end the diaphragm is clamped between flange 43 of bushing 44 and nut 45 screwed on bushing 44. Bushing 44 is slid on the end 4 of the driving shaft and coupled therewith by means of key 14. Diaphragm 42 is at its circumference fixed to roller 1 by means of ring 46. Between bushing 44 and roller 1 sufficient clearance has been left to permit the roller to make an axial movement relative to the driving shaft and heating block 31.

Screwed on the driving shaft is an adjusting nut 10 with the aid of which diaphragm 42 may be bent to exert on roller 1 an axial force that is directed toward heating block 31. Consequently, diaphragm 42 serves not only to obtain the tiltable coupling of the roller with the driving shaft, but also the force directed toward heating block 31.

With the embodiment shown in FIG. 4, roller 1 is provided with bronze bearing bushing 47 which is slid on end 4 of driving shaft 5 with some clearance being left. The amount of clearance is sufficient for the roller to make the tilting movement required.

The coupling of the roller with the driving shaft is effected by means of a flexible coupling which comprises a small disc 48 provided with a projecting pin 49 which engages with recess 50 provided in roller 1. Pin 49 also serves as a breaking piece which breaks when the apparatus is subject to sudden overloads. Provided in the disc 48 is a square hole which fits on a correspondingly shaped part 51 of the driving shaft. Roller 1 is forced toward heating block 31 by means of two cup-washers 6, 7, which transmit their pressure to the roller via a disc 52. The pressure of the cup-washers can be set with the aid of nut 10, which is screwed on the end of the driving shaft. A heat-insulating cap 53 seals conical recess 2 of roller 1. Driving shaft 5 is rotatably supported by two ball bearings 16, 54 accommodated in bushing 17.

With the variant embodiment shown in FIG. 5, the tilting movement of roller 1 is obtained by means of a self-adjusting needle bearing 55 housed in bushing 17. Resting in the needle bearing is the end of a hollow short shaft 56 which at its opposite end carries roller 1. Located in the short shaft are end 4 of the driving shaft 5, helical spring 57 and adjusting nut 10. Spring 57 presses against the internal collar 58 of short shaft 56, thus providing the axial force by which roller 1 is forced toward heating block 31. The coupling of roller 1 with driving shaft 5 is effected with the aid of two diametrically opposed forked recesses 59, 60 provided in the left end of short shaft 56 in which there fits pin 61 that passes through driving shaft 5.

Figure 6:
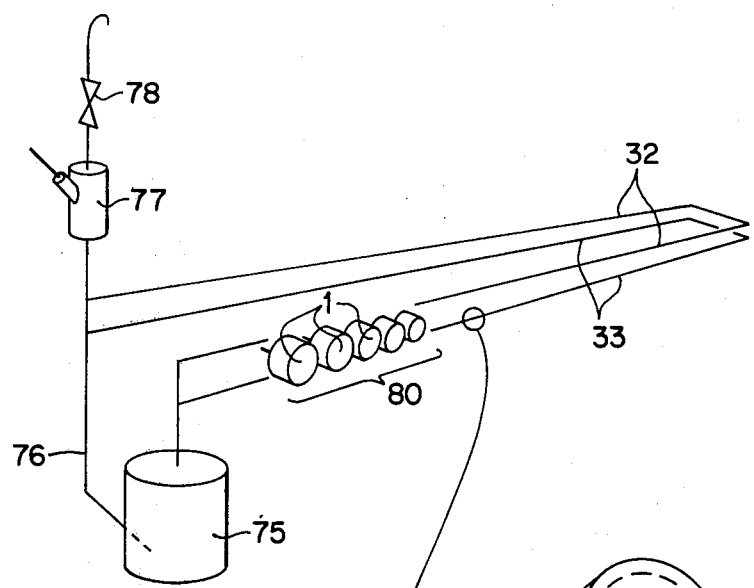
FIG. 6 shows a transport system for a heating medium.
Figure 7:
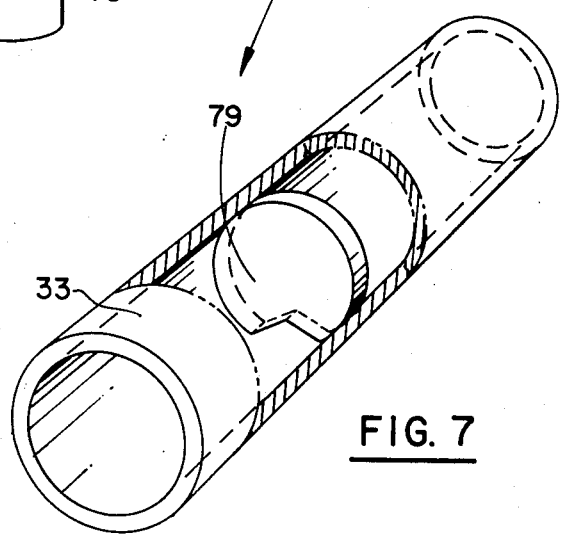
FIG. 7 shows a detail of the transport system of FIG. 6.

FIGS. 6 and 7 schematically show how steam-heating may be applied to a plurality of rollers. The rollers are formed into a number of groups, only one of which is shown in FIG. 6 and referred to by numeral 80. Each roller of a group is connected with a system of channels 32, 33, already discussed hereinbefore. At their one end channels 32, 33 are connected with a boiler 75 and at their other end they run into a condensate return line 76.

The return line 76 is connected with a deaeration vessel 77 provided with a deaeration valve 78. Positioned in the system of channels 32, 33 are a plurality of partitions which are each located between two successive groups of rollers.

In FIG. 7 numeral 79 refers to one of the partitions located in channel 33. It is in the form of a circular plate provided with a V-shaped recess.

As steam passes through channels 32, 33 condensate will also be formed upon heat being emitted to rollers 1.

In downstream direction the amount of steam passing through the channels will decrease, whereas the amount of condensate will increase.

An increase in the condensate level at the partition 79 will result in the passage through the V-shaped hole being reduced. At this point the rate of flow of the steam will therefore be increased, which leads to a pressure difference across the partition that is proportional to a square of the local flow rate. As a result of the pressure difference the condensate is forced through the hole of the partition to the next partition and, in this way, to the condensate return line.

The shape and the dimensions of these local flow restrictions are not very critical. The recess in the partition may, for instance, be in the shape of a V having an apex of 120°, as shown in FIG. 7, but other shapes are also conceivable.

In a channel having a diameter in the range of from 20 to 30 mm., the recess may be so shaped that it could be fully shut off by a stream of condensate having a height of 6 mm. or more. The partitions may be spaced at intervals of approximately 2 meters.

In the afore-described manner, a proper transport of steam and condensate is effected with simple means. The use of the above-discussed transport system, however, is not limited to the afore-described application. It may in general be applied for the transport of a substance simultaneously present in two states of aggregation, a gaseous state and a liquid state.

Figure 8:
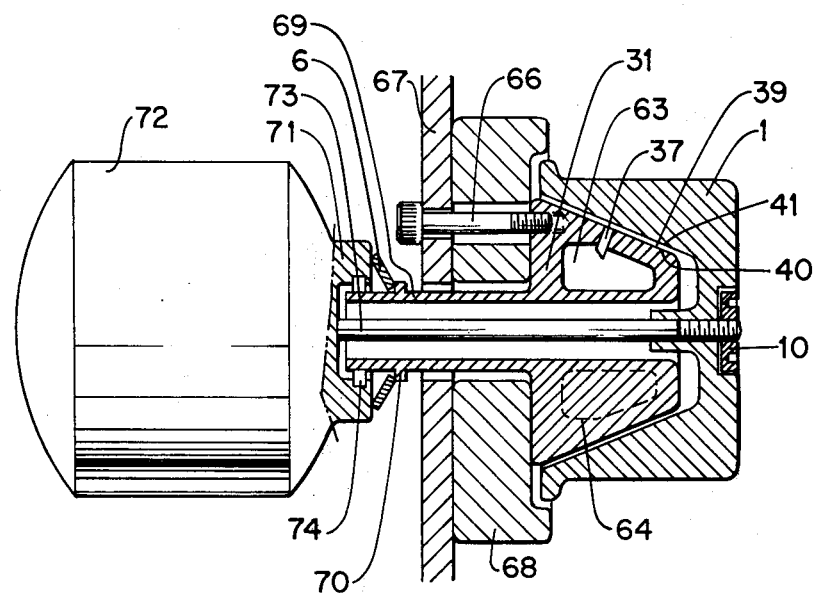
FIG. 8 shows a different embodiment of the transport roller according to the invention.

With the embodiment shown in FIG. 8, the roller is provided with a conical transfer-gap 39. To this end roller 1 is on its inside provided with conically shaped transfer-surface 41, which faces the likewise conically shaped transfer-surface 40 of heating element 31. Provided inside the heating element is annular channel 63 in the lower part of which there is positioned a partition. In the lower half of the cross-sectional view this partition is indicated by a dash line 64.

Figure 9:
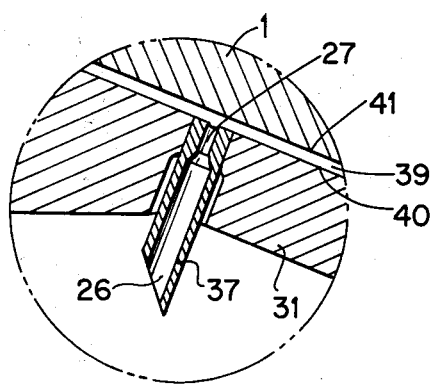
FIG. 9 shows a detail of the embodiment of FIG. 8.

Positioned on the circumferential surface of heating element 31 are equally spaced supply channels, which communicate with annular channel 63 and transfer-gap 39. One of these channels, referred to by numeral 37 in FIG. 1, is shown in detail in FIG. 9. It consists of tubelet 37 which is at one end soldered in conically shaped wall 65 of the heating element and bevelled at the other. The tubelet comprises a wide portion 26 and a narrow portion 27. The latter portion forms a restriction which is in direct communication with the transfer-gap.

The heating element is fixed to a machine frame 67 with the aid of bolts as referred to by numeral 66. For the purpose of preventing heat losses there has been provided an insulation block 68, which is positioned between heating element 31 and machine frame 67.

The heating element 31 is provided with a cylindrical hollow branch piece 69 with collar 70. Bearing against collar 70 is cup-washer 6, whose circumferential rim presses against a flange 71 of driving motor 72. The driving motor has a relatively thin shaft 73, which passes through heating element 31. Roller 1 is screwed on the right-hand end of shaft 73 with the aid of an adjusting nut 10. For the purpose of centering the shaft, the driving motor 72 rests with its flange 71 on cylindrical branch piece 69 via an O-ring 74. In order to relieve heating element 31 of the weight of the driving motor, the latter is supported by a number of springs (not shown).

The afore-described apparatus operates as follows. Prior to driving motor 72 being switched on, compressed steam is supplied to annular channel 63. The steam not only serves as a medium for heating the roller, but it is also utilized for maintaining a very narrow transfer-gap 39, in that it can partially escape through the restriction provided in the conically shaped wall 65. Thus, roller 1 is subject to two balancing forces, the one trying to move roller 1 to the left under the influence of cup-washer 6 and the other trying to force the roller to the right under the influence of the steam pressure built up in the transfer-gap.

The equilibrium of forces can be maintained with the slit having a width of approximately 10μ m.

Owing to the aforementioned construction, roller 1 can make a tilting movement enabling the transfer-surfaces 40, 41 sufficiently so to adjust themselves that they are parallel to each other.

Figure 10:
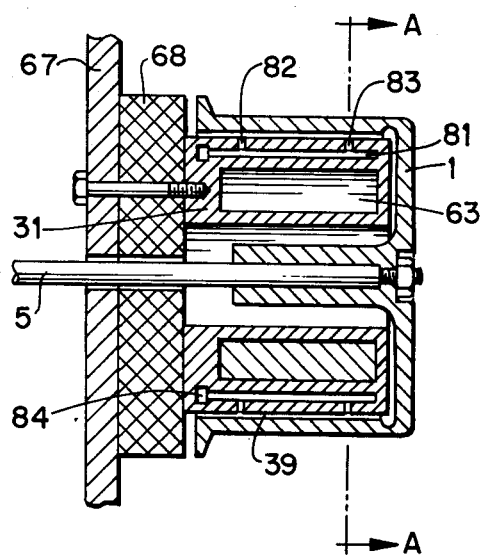
FIG. 10 shows a further embodiment of the transport roller according to the invention.
Figure 11:
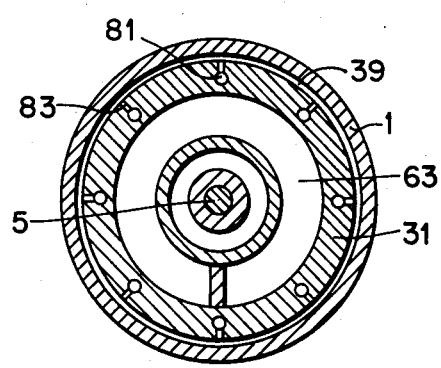
FIG. 11 is a cross section of the transport roller along the line A—A in FIG. 10.

FIGS. 10 and 11 show an embodiment of a transport roller with a cylindrical transfer-gap.

Fixed to machine frame 67 is a cylindrical heating element 31. An insulation block 68 has been provided between heating element 31 and machine frame 67 in order to prevent heat losses. In heating element 31 there is a ring-shaped channel 63 to which a heat-transfer medium may be supplied. This heat-transfer medium may serve to cool or heat roller 1. In the embodiment shown steam is supplied to channel 63 in order to heat the roller.

In heating element 31 there are provided eight axial bores, one of which is indicated by reference numeral 81 in FIGS. 10 and 11. To each of these bores 81 there are connected two small supply channels 82, 83 which act as restrictions and which end in the cylindrical transfer-gap 39. All the axial bores 81 communicate with a ring-shaped channel 84 which is connected to a source of compressed air, not shown in the drawing. Due to the supply of compressed air to the transfer-gap 39 via the ring-shaped channel 84, the axial bores 81 and restrictions 82 and 83, an air cushion is maintained between roller 1 and stationary heating element 31. The air cushion serves both to support roller 1 and to transfer heat to it. In order that roller 1 may center itself relative to cylindrical heating element 31, the roller is mounted on driving shaft 5 which enables roller 1 to make a tilting movement.

If more of these transport rollers are provided on both sides of a machine, they may be mounted coaxially in pairs, namely one roller of a pair on the one side of the machine and the other roller of the pair on the other side of the machine. Each of these roller pairs may be driven by a separate driving motor, which is provided in the middle of the roller pair.

What is claimed is:

1. An apparatus for transfer of heat between a first body and a yarn transport roller mounted on a driving shaft rotatably connected to said first body, said first body and yarn transport roller being variably movable relative to each other, said first body and yarn transport roller having co-operating transfer surfaces adjacent and closely spaced to form a transfer gap, said transfer surfaces being symmetric and axially equidistant and perpendicular to the axis of rotation, comprising means for heating said first body, spring means for axially urging the yarn transport roller toward said first body, and means for supplying a non-solid interspacial substance under pressure to said transfer gap to transfer heat from said body to said yarn transport roller and to cause the pressure of said non-solid interspacial substance to vary inversely with width of said transfer gap.

2. An apparatus according to claim 1 wherein said first body is provided with at least one flow restriction ending in the transfer gap whereby the non-solid substance is supplied from a pressure source.

3. An apparatus according to claim 2 whereby the pressure source is constant.

4. An apparatus according to claim 1 wherein said yarn transport roller is slidably attached on said driving shaft.

5. An apparatus according to claim 1 and further comprising means mounting said roller for tilting movement relative to the first body.

6. An apparatus according to claim 5 wherein the roller is mounted on a driving shaft at least part of which has a low flexural rigidity.

7. An apparatus according to claim 5 wherein the roller is mounted on one end of a short driven shaft connected at the opposite end with the driving shaft by a coupling, said coupling comprising a coupling half section having internal teeth mounted on the driving shaft, and a coupling half section having external teeth mounted on the short driven shaft said external teeth meshing with said internal teeth.

* * * * *